(12) United States Patent
Highnam et al.

(10) Patent No.: US 9,008,382 B2
(45) Date of Patent: Apr. 14, 2015

(54) METHOD AND SYSTEM FOR ANALYSING TISSUE FROM IMAGES

(76) Inventors: Ralph Highnam, Wellington (NZ); John Michael Brady, Headington (GB); Nico Karssemeijer, Ubbergen (NL); Martin Yaffe, Toronto (CA)

( * ) Notice: Subject to any disclaimer, the term of this patent is extended or adjusted under 35 U.S.C. 154(b) by 565 days.

(21) Appl. No.: 13/261,165

(22) PCT Filed: Aug. 3, 2010

(86) PCT No.: PCT/GB2010/001472
§ 371 (c)(1),
(2), (4) Date: Apr. 16, 2012

(87) PCT Pub. No.: WO2011/015818
PCT Pub. Date: Feb. 10, 2011

(65) Prior Publication Data
US 2012/0189175 A1    Jul. 26, 2012

(30) Foreign Application Priority Data

Aug. 3, 2009 (NZ) ........................................ 578763
Aug. 3, 2009 (NZ) ........................................ 578764
Apr. 1, 2010 (NZ) ........................................ 584397

(51) Int. Cl.
G06K 9/00 (2006.01)
G06T 7/00 (2006.01)
G06T 7/40 (2006.01)

(52) U.S. Cl.
CPC .............. *G06T 7/0012* (2013.01); *G06T 7/403* (2013.01); *G06T 2207/30068* (2013.01)

(58) Field of Classification Search
CPC ................... G06T 7/0012; G06T 2207/30068; G06T 7/403
USPC .......................................................... 382/128
See application file for complete search history.

(56) References Cited

U.S. PATENT DOCUMENTS 5,452,367 A *  9/1995  Bick et al. ..................... 382/128
7,315,640 B1    1/2008  Brady
(Continued)

FOREIGN PATENT DOCUMENTS

| | | |
|---|---|---|
| CN | 101234026 | 8/2008 |
| WO | WO99/08225 | 2/1999 |

(Continued)

OTHER PUBLICATIONS

European Patent Office Examination Report, Communication Pursuant to Article 94(3) EPC in European Appl. No. 10754771.3-1906, dated Sep. 18, 2014, pp. 1-4.

(Continued)

*Primary Examiner* — Tom Y Lu
(74) *Attorney, Agent, or Firm* — William H. Bollman

(57) ABSTRACT

Disclosed is a method of analyzing tissue from an image comprising providing an electronic image of tissue (100, 400, 450, 600, 800, 1100), determining a reference value from the image (1070, 1170, 1270), establishing an $h_{int}$ representation (500,700) of the image, and using the $h_{int}$ representation in analysis of the tissue to quantify the breast and compute a calibration error. Also disclosed is a system which runs an inner breast edge detection algorithm (1310) on the electronic image to detect the inner breast edge on the image (1315), and refined the inner breast edge location (1340) if a calibration error is not acceptable (1324). Also disclosed is automatic estimation of breast composition and temporal analysis of images.

10 Claims, 8 Drawing Sheets

(56) References Cited

U.S. PATENT DOCUMENTS

| | | | |
|---|---|---|---|
| 2004/0101181 | A1 | 5/2004 | Giger |
| 2006/0167355 | A1* | 7/2006 | Rico et al. .................. 600/407 |
| 2008/0187095 | A1* | 8/2008 | Boone et al. ................ 378/37 |
| 2008/0292217 | A1 | 11/2008 | Claus |
| 2009/0143676 | A1* | 6/2009 | Matsumura ................. 600/438 |
| 2011/0280465 | A1* | 11/2011 | Wehnes et al. .............. 382/132 |

FOREIGN PATENT DOCUMENTS

| | | |
|---|---|---|
| WO | WO99/63480 | 9/1999 |
| WO | WO00/52641 | 9/2000 |
| WO | WO03/067371 | 8/2003 |
| WO | WO2004/000110 | 12/2003 |
| WO | WO2004/000121 | 12/2003 |
| WO | WO2004/049949 | 6/2004 |
| WO | WO2007/090892 | 2/2007 |
| WO | WO2008/038525 | 4/2008 |
| WO | WO2008/052854 | 5/2008 |
| WO | WO2008/088478 | 7/2008 |
| WO | WO2011/015818 | 2/2011 |

OTHER PUBLICATIONS

European Patent Office Examination Report, Communication Pursuant to Article 94(3) EPC in European Appl. No. 10754771.3-1906, dated Sep. 24, 2014, pp. 1-5.

First Office Action received in Chinese Appl. No. 201080044509.6 dated Dec. 26, 2013.

Second Office Action (with English translation) received in Chinese Appl. No. 201080044509.6 dated Sep. 4, 2014.

European Patent Office, 21 documents cited in relation to EP2462561, dated Nov. 18, 2014.

\* cited by examiner

METHOD AND SYSTEM FOR ANALYSING TISSUE FROM IMAGES

FIELD OF THE INVENTION

The present invention relates to the analysis of an image. A reference value on the image is established and the image can be self-calibrated and thus quantified.

BACKGROUND OF THE INVENTION

Many in the field are attempting to quantify images for various purposes but encounter issues relating to errors or unknown values in the imaging physics data. For example, trying to quantify the image based on an absolute model of the physics along with assumed properties of tissue needs all the imaging physics data to be known and accurate. Even the inclusion of a quantification step wedge into each image still requires much of the imaging physics data and assumes it is accurate. Hence the need to use in-image reference values.

For example, a mammogram is created by sending x-ray photons towards the breast and then detecting how many x-ray photons make it through. The smaller the number of x-ray photons that make it through, the denser the breast tissue.

Breast density has been linked by many studies to likelihood of developing breast cancer and most of those studies have assessed breast density either using visual or semi-automated methods. A general overview is given, for example, in Breast Cancer Research's review series, including Vachon et al, "Mammographic density, breast cancer risk and risk prediction" (Breast Cancer Research, 2007, vol 9:217), Martin and Boyd, "Potential mechanisms of breast cancer risk associated with mammographic density" (Breast Cancer Research, 2008, Vol 10:201) and Yaffe, "Measurement of mammographic density" (Breast Cancer Research, 2008, Vol 10:209).

PRIOR ART

In particular, references are made here to: Highnam (1992) "Model-based mammographic image processing", (PhD Thesis, University of Oxford 1992), Highnam and Brady 1999 "Mammographic Image Analysis" (Kluwer Academic Publishers, 1999), Highnam 2006 "Breast composition measurements using retrospective standard mammogram form (SMF)" (Physics in Medicine & Biology, 2006), Highnam 2007 "Comparing measurements of breast density" (Physics in Medicine & Biology, 2007), Van Engeland 2006 "Volumetric breast density estimation" (IEEE Medical Imaging, 2006), Hartman 2008 "Volumetric assessment of breast tissue composition" (International Workshop on Digital Mammography 2008), Kaufhold 2002 "Calibration approach to glandular tissue composition" (Medical Physics, 2002), Blot 2005 "Volumetric approach to risk assessment" (Physics in Medicine & Biology, 2005), Heine 2006 "Effective x-ray attenuation measures" (Medical Physics, Vol 33, 2006), Heine 2008 "Effective x-ray attenuation coefficient measurements from two full-field digital mammography systems" (BioMedical Engineering OnLine, 2008, Vol 7:13)

The use of standard image processing techniques to generally quantify texture and apply them to mammograms is further described in: Miller 1991, "Classification of breast tissue by texture analysis" (British Machine Vision Association Conference, 1991), Karssemeijer 1998, "Automated classification of parenchymal patterns in mammograms" (Physics in Medicine & Biology, 1998), Olsen 2007 "Automatic segmentation of fibroglandular tissue" (Image Analysis 2007), Raundahl 2008, "Automated effect-specific mammographic pattern measures" (IEEE Medical Imaging 2008), Hadley 2007 "Risk classification of mammograms using anatomical linear structures and density", (Pattern Recognition and Image Analysis, 2007), Freixent 2008 "Eigendetection of masses considering false positive reduction and breast density information" (Medical Physics, 2008) Raundahl 2007 "Breast tissue density measure" (WO/2007/090892), Magnin 1986 "Mammographic texture analysis: an evaluation of risk for developing breast cancer" (Optical Engineering 1986), Caldwell 1990.

Additionally: "Characterization of mammographic parenchymal pattern by fractal dimension" (Vol 35, Physics in Medicine and Biology 1990), Luo 2007 "Method for classifying breast tissue density" (WO/2008/088478), Giger 2003 "Risk-modulated diagnosis of disease" (WO/2003/067371), Hui 1999 "Computerized assessment of breast cancer risk" (WO/1999/063480), Thornton 1998 "Early detection and aid to diagnosis" (WO/1999/008225), Li 2006 "Mammary gland quantification" (CN01234026), Zhou 2001 "Estimation of breast density on mammograms" (Medical Physics 28(6), 2001), Saha 2001 "Breast tissue density quantification via digitized mammograms" (IEEE Medical Imaging, Vol 20, 8, 2001), Bovis 2002 "Classification of mammographic breast density using a combined classifier paradigm" (IWDM 2002, p 77-80, 2002), Petroudi 2003 "Classification of mammographic parenchymal patterns" (IEEE Medicine & Biology, Vol 2, p 416-423, 2003), Lui 2004 "Mammographic parenchymal patterns for assessing risk" (Medical Physics, Vol 31, no 3, 2004), Karssemeijer 1998 "Automated classification of parenchymal patterns in mammograms" (Physics in Medicine & Biology, 1998), Sivaramakrishna 2001 "Automatic segmentation of mammographic density" (Academic Radiology, 2001), Wei 2004 "Correlation between mammographic density and volumetric fibroglandular tissue estimated on breast MR images." (Medical Physics, 31 (4), 2004), Boehm 2008 "Automated classification of breast parenchymal density: topologic analysis of x-ray attenuation patterns" (AJR, 191, p 275-282, 2008), Jamal 2006 "Breast density into Tabar's patterns" (Physics in Medicine & Biology, 2006), Torres-Majia 2005, "Comparison of Qualitative and Quantitative Evaluations" (Cancer Epidemiology Biomarkers & Prevention, 2005), Heine 2008.

Other sources include: "Automated approach for estimation of breast density" (Cancer Epidemiology, Biomarkers & Prevention, Vol 17, November 2008), Oliver 2008 "Novel breast tissue density classification methodology" (IEEE IT in Biomedicine, 2008), Li 2005 "Computerized texture analysis of mammographic parenchymal patterns" (Academic Radiology 2005), Megalooikionomou 2007 "Analysis of texture in medical images with an application to breast imaging" (SPIE Medical Imaging 2007), Chang 2002 "Computerized assessment of tissue composition" (Academic Radiology, 2007), Glide-Hurst 2007 "A new method for quantitative analysis of mammographic density", (Medical Physics 2007), Taylor 1994, "Measuring image texture to separate difficult from easy mammograms", and Heine 2000 "Statistical methodology for mammographic density detection" (Medical Physics, 27, 2000).

These references also indicate known means that attempt to emulate semi-automated thresholding techniques, such as Cumulus, which is perceived to be exemplary for breast density measurement.

One solution to the quantification of breast tissue entails insertion of a step wedge in each image. For example: Diffey 2006 "New step wedge for volumetric measurement of density" (IWDM 2006), Augustine 2006 "Volumetric breast density estimation" (IWDM 2006), Patel 2006 "Automated breast tissue measurement of women" (IWDM 2006) and Shepherd 2005 "Novel use of single x-ray absorptiometry for measuring breast density" (Technology in Cancer Research & Treatment, 2005, Vol 4: 173-182).

Alternative approaches known in the field include: the use of simple physics to split the breast into density classes, although such method does not appear to use in-image reference data (Merelmeier 2007 "Displaying an x-ray image recorded on mammography," WO/2008/052854); simple tissue density method not using any image calibration (Tasaki 2007 "Imaging system," WO/2008/038525); tissue density via a scout x-ray exposure (Jing 2003 "Mammography with tissue exposure control, Tomosynthesis," WO/2004/049949); use of a grid on top of a compression plate to find breast thickness (Yang 2003 "Measuring the thickness of compressed objects" WO/2004/000121); use of phantom images to work out the breast edge thickness (Rico 2003 "Determining peripheral breast thickness" WO/2004/000110); use of a physical grid for a manual assessment of density (Bershtejn 2008 "Adipose tissue percentage evaluation in mammary gland" RU2325852); use of density for prognosis purposes (Giger 2003 "Computerised image analysis prognosis" US2004101181); use of density image for reconstruction purposes (Clause 2008 "Quantitative image reconstruction method" US20080292217); film work covering film-curve approximations (Highnam 2000 "X-ray image processing" WO/2000/052641); use of the pectoral muscle to normalize the data (Kotsuma 2008 "Quantitative assessment of mammographic density and breast cancer risk for Japanese women" Breast, 2008); and improved semi-automated threshold technique (Byng 1994 "Quantitative analysis of mammographic densities", Physics in Medicine & Biology, 1994); use of dual energy as per bone density (Shepherd 2002 "Measurement of breast density with dual x-ray absorptiometry: feasibility" Radiology 2002); computation of density from MRI (Klife 2004 "Quantification of breast tissue index from MR data using fuzzy clustering", IEEE Engineering in Medicine & Biology Society, 2004); and computation of density from ultrasound (Glide 2007 "Novel approach to evaluating breast density utilizing ultrasound tomography" Medical Physics, 2007).

However, errors and unknown values in the image physics make such approaches inherently unreliable.

Research undertaken by Highnam and Brady resulted in an understanding of how to automatically compute the density of breast tissue from a mammogram using a mix of image processing and x-ray physics with associated imaging physics data which generally relates to conversion of a pixel value P(x,y) measured at coordinates (x,y) in the mammogram into a thickness of fat, $h_{fat}(x,y)$ cm, and a thickness of "interesting tissue," $h_{int}(x,y)$ cm, where "interesting tissue" could be fibrous tissue, glandular tissue, water, or cancerous tissue.

Additionally, there has recently been interest in creating a three dimensional image of the breast via a technique called tomosynthesis whereby a sequence of mammograms is taken at varying angles around the breast and a three dimensional image reconstructed.

The process by which the $h_{int}$ representation has been computed to date, as put forward by Highnam & Brady (1999) comprises 8 steps as shown in FIG. 2. Similar processes have been put forward by Van Engeland 2006 albeit excluding steps S3, S6, S7, S8 and by Hartman 2008, who noted that S4 is not necessary for digital mammography and reported modification to S6.

Kaufhold (2002) and Heine (2006, 2008) consider the process of generating $h_{int}$ in a more systemic way, generating calibrated data on one x-ray system prior to data collection and without using image data for self-calibration purposes.

In more detail and referring to FIG. 2: Data from film mammogram 202, digital mammogram 204, and/or digital tomographic projection 206 is subjected to a number of steps beginning with:

Step 1 210 Segmentation—the application of some form of image processing to delineate the inner breast edge 310 and outer breast edge 360 and the pectoral muscle 380 (FIG. 3)

Step 2 215 Pixel Value to Energy—converting the pixel value P(x,y) in the mammogram at position (x,y) to energy imparted to the detector at (x,y). This involves understanding the physics of the particular detector.

Step 3 220 Detector Blur Correction—using knowledge of the physics of the particular detector to remove any blur it might introduce. For digital systems, this step is often unnecessary.

Step 4 225 Correct for Anode Heel—taking into account the x-ray tube's anode heel effect, which gives spatially varying incident radiation intensity over the breast and correcting for it so as to give an image which appears as if the incident radiation intensity was constant. In digital systems, this is usually carried out automatically by the manufacturer as part of their 'flat fielding' process.

Step 5 230 Correct for Compression Plate Slant—acknowledging that when a breast is compressed in preparation for a mammogram the top compression plate slants; this correction compensates for that slant by (typically) adding in a virtual wedge of fat.

Step 6 235 Estimate Breast Thickness—recognizing that the breast thickness recorded by the x-ray machine can be in-accurate and that another estimate can be made from the image itself by finding an area of the image which is mostly fat and then working out how much fat there must be.

Step 7 240 Remove Scatter; and

Step 8 245 Remove Extra-Focal. The energy imparted to the detector has a primary component (the x-ray photons that come straight through the breast unimpeded), a scatter component (the x-ray photons have been deflected) and around the breast edge a component related to extra-focal radiation (x-ray photons that exited the x-ray tube away from the focal spot). In these steps, the scatter and extra-focal components are estimated to obtain just the primary component.

Step 9 250 Generate $h_{int}$ 255 from Primary. From the primary component the requisite x-ray attenuation can be calculated and thence the thicknesses of fat and interesting tissue, mathematically:

$$E_{primary}^{imparted}(x, y) = \phi(V_t, x, y) A_p t_s \quad \text{Equation 1}$$

$$\int_0^{E_{max}} N_0^{rel}(V_t, \varepsilon) S(\varepsilon) G(\varepsilon) e^{-\mu_{luc}(\varepsilon) h_{plate}} e^{-h\mu(x,y,\varepsilon)} \varepsilon d\varepsilon$$

Where $\phi$ is the photon flux, $V_t$ is the x-ray tube voltage, $A_p$ is the area of the pixel, $t_s$ is the time of exposure, $N_0^{rel}$ is the relative number of incident x-ray photons for this tube voltage at energy $\varepsilon$, $S(\varepsilon)$ is the detector absorption, $G(\varepsilon)$ is the grid transmission, and the final two terms are the attenuation due to the Lucite compression plate and the attenuation due to the breast.

The left hand side of the equation is known from previous steps, the imaging physics data (x-ray tube voltage etc) is known for digital images as the values are automatically stored with the image, thus the only unknown is the attenuation due to the breast, $h\mu(x,y,\epsilon)$. Attenuation due to the breast can be determined using an iterative technique, which entails trying various thickness of interesting tissue and fat until the required attenuation is seen:

$$h\mu(x,y,\epsilon)=h_{int}(x,y)\mu_{int}(\epsilon)+h_{fat}(x,y)\mu_{fat}(\epsilon)$$

This could also be solved using linear approximations. Obviously, that has 2 unknowns, but they are not independent:

$$h_{int}(x,y)+h_{fat}(x,y)=H \text{ (the compressed breast thickness, from step 6).}$$

From the equations above, it should be clear that all the imaging physics data is important but in particular the compressed breast thickness, H, is a key parameter, as demonstrated by Highnam & Brady 1992, 1999, 2006 and others. Problematically, film mammograms rarely have breast thickness recorded and this is why an estimate from the image is usually made for film images.

There have been many publications in which the method described is used: for example by Ding, McCormack and Jefferies, and for film in particular the method appears to work moderately well.

Breast thickness is particularly relevant in so far as the volume of the entire breast is effectively the number of pixels inside the breast multiplied by the breast thickness:

BreastVolume (cm³)=Number of Pixels×Pixel Area× Breast Thickness

And breast density is the ratio of interesting tissue to breast volume. Both density and volume are substantially reliant on an accurate breast thickness. In fact, academic work (Highnam & Brady 1999, Blot 2005) has suggested that errors of 1 mm in the breast thickness can lead to errors in breast density of 2-3%.

Recently, Hartman 2008 has reported using software based on the Highnam and Brady method on digital mammograms, whereby Highnam and Brady's method was adjusted to combine an estimated and recorded breast thickness rather than just the estimated breast thickness.

Highnam (2006) demonstrated the importance of breast thickness and described how estimation of breast thickness entailed a form of imaging physics data compensation. That is, errors in time of exposure, tube voltage, and other imaging physics data were being corrected for by using the image itself and by adjusting the breast thickness. This was done on the basis of being able to find an area of the image which represented entirely fatty tissue.

Although successful in generating valid $h_{int}$ values and reasonable breast densities against visual assessment, the approach has several drawbacks, especially for digital images where a recorded breast thickness is known from the digital machine itself. For example, the recorded breast thickness might not be the main error, especially at quality controlled sites where the recorded breast thicknesses are carefully calibrated and checked on a regular basis. Thus the error correction performed via estimation of breast thickness might not be correcting for error in the correct way. If the error was in the time of exposure ($t_s$) then an error correction should be multiplicative; instead it is effectively corrected inside the integral in an exponential fashion. There is potential for further error if the area of the image is believed to be fat tissue is not fat tissue but dense tissue.

Van Engeland 2006 took the view that the recorded breast thickness was reliable and simplified the equations to arrive at a relationship between pixel value P and $h_{int}$:

$$h_{int}(x,y)=\ln(P(x,y)/P_{fat})/(\mu_{fat}-\mu_{dense})$$  Equation 2 where $P_{fat}$ is the pixel value of a block of tissue which has only fat within it (other than the skin), and the $\mu_{fat}$ and $\mu_{dense}$ are effective x-ray linear attenuation coefficients worked out from the tube voltage, target, filter, and recorded breast thickness.

On the whole, such an area can be found using image processing but for dense breasts it can often fail. In FIG. 4, the mammogram on the left is a fatty breast 400 and is relatively straightforward to determine an area of all fat. The breast on the right is very dense 450 and finding such an area of all fat is far more difficult.

The present invention resolves erroneous indications and error in calculation and calculation bases by always finding a reliable reference spot in the image and thence calculating an explicit calibration error, which means that, accurate imaging physics data is unnecessary and in fact the mAs and much of the detector information can be ignored, other than assuming that the detector is linear with a known offset.

The method is consequently far more robust to errors and unknown data in the imaging data, and has an associated calibration error factor which can be used to alert the user as necessary.

Previous attempts to find a good reference spot have relied on finding a noise-resistant maximum or minimum (to indicate the fattiest part of the breast) inside the inner breast edge (see FIG. 3), where the inner breast edge 310 is determined by finding the inner-most homogeneous curve around the edge of the breast (Highnam and Brady 1999).

Other solutions attempted to find the inner breast edge using local phase and orientation ("The use of multi-scale monogenic signal on structure orientation identification and segmentation", Pan, Brady, Highnam, Declerck, International Workshop on Digital Mammography 2004); and using the recorded breast thickness and a spherical breast edge model to move in from the outer breast edge a certain distance (Van Engeland 2006). Using the homogeneous curve approach is slow; using local phase is unreliable due to noise issues; and although using the spherical model is fast and works well for fatty breasts it does not work on dense breasts.

The present invention determines an inner breast edge in a manner which is reliable for all breasts and thus leads to a reliable $P_{fat}$ value for all images and thence an imaging physics data error can be computed.

SUMMARY OF THE INVENTION

According to a first aspect of the present invention there is provided a method of analysing tissue from an image comprising the steps of:
  providing an electronic image of tissue;
  determining a reference pixel;
  establishing an $h_{int}$ representation of the image; and
  using the $h_{int}$ representation in analysis of the tissue, including provision of a calibration error.

According to a second aspect of the present invention there is provided a method and system whereby a pixel value P(x,y) measured at coordinates (x,y) in the image data is converted into a thickness of 'tissue A' for example fat, $h_{fat}(x,y)$ cm, and a thickness of 'tissue B', $h_{int}(x,y)$ cm, where 'tissue B' comprises "interesting tissue" for example, fibrous tissue, glandular tissue, water, or cancerous tissue. Alternatively, the image data might be converted into a single tissue thickness.

The present invention therefore relates to the analysis of an image, whereby a reference value is chosen based upon a analysis of either the breast tissue internal to the inner breast edge or the breast tissue between the inner and outer breast edges, where the inner breast edge is determined initially using phase congruency, or a threshold value established from breast tissue image statistics. Once that reference value is found, the image can be self-calibrated and thus quantified.

The present invention resolves erroneous indications and error in calculation and calculation bases by always finding a reliable reference spot in the image which then allows calculation of an explicit calibration error.

The method is consequently far more robust to errors and unknown data in the imaging data, and has an associated calibration error factor which can be used to alert the user as necessary.

Preferably the method includes steps for establishing the reference spot whereby,
- a histogram of the breast tissue in the image is generated;
- a gap which lies between two peaks of the histogram is detected; and
- the gap location corresponds to an inner breast edge which is then used to establish where to search for the reference spot. The gap can also be detected by using phase congruency, or by determining a threshold value, which is computed by looking at the breast image statistics such as minimum and maximum pixel values, average pixel values or median pixel values.

Alternatively, a reference spot is established by the extrapolation of a reference pixel value from data in the breast edge.

Occasionally, the reference spot is not ideal for certain breasts and improvement can be achieved by moving the inner breast edge inwards, for example by one or more of the following: based on area of breast; based on breast edge area; and/or in an iterative manner until an intensity edge is found along sufficient of the length of the inner breast edge or a smooth homogeneous edge is found.

Once a good reference pixel is obtained, an explicit calibration error ($\kappa$) may be introduced into Equation 1. This can be adjusted until the image data (on the left of this equation), matches theoretical data for that reference pixel (as shown on the right of this equation):

$$E_{primary}^{imparted}(x, y) = $$
$$\kappa \phi(V_t, x, y) A_p t_s \int_0^{E_{max}} N_0^{rel}(V_t, \varepsilon) S(\varepsilon) G(\varepsilon) e^{-\mu_{luc}(\varepsilon) h_{plate}} e^{-h\mu(x,y,\varepsilon)} \varepsilon d\varepsilon$$

A calibration error of 1 is considered to be exemplary; a movement above or below 1 indicates an error. The system parameters can be set at any desired value however, a calibration error of close to 1 would provide the most accurate data.

According to a further aspect, there is provided a system for analysis of tissue from an image of a breast comprising:
(a) providing an electronic image of tissue;
(b) running an inner breast edge detection algorithm on the electronic image to detect the inner breast edge on the image to produce a result;
(c) checking if calibration error of the result is acceptable;
(d) notifying the user of the results, or not, according to the deviation of the calibration error.

Preferably, the analysis of the tissue in both aspects of the invention thus far discussed results in automatic estimation of breast composition by: calculating $h_{int}$ and $h_{fat}$ values; summing up the $h_{int}$ and $h_{fat}$ values; and subsequently computing breast density.

Other analysis options include optimized display of the image ready for the radiologist to view; tracking an object's development over time to ascertain whether it is growing; computer-aided detection, whereby the computer marks onto the image suspect areas for the radiologist to consider; and generally analyzing multiple images (temporal, dual energy, views etc).

Preferably, a number of images gathered over a period of time are analysed according to the method and system of the invention and automatically compared. This temporal comparison of images is preferably effected by aligning standardised images. The alignment is preferably facilitated using points of reference such as nipple and chest wall. A report can be produced or if a change has been detected this is flagged to a radiologist.

In a preferred embodiment of the method and system, calcification of tissue is quantified and removed from subsequent analysis. This is useful as calcification is dense tissue and its presence makes the tissue seem denser thus affecting any results.

Preferably, in the method and system a range of reference spots or values are found to enable the differentiation of more than two classes of tissue from different imaging modalities.

In the method and system described, a pixel value of an electronic image is a voxel value corresponding to a three dimensional position in space (x,y,z).

This description refers to one embodiment: the quantification of breast images and in particular mammograms (breast x-rays).

Density is closely linked to the composition of the breast tissue: fatty tissue is least dense; fibroglandular and cancerous tissue is reasonably dense; calcification is very dense. For overall breast composition purposes calcification can generally be ignored because it occurs in such minute amounts. However quantification of calcification is an important by-product of our invention and is referred to below.

Let:
Volume of fatty tissue in breast=$V_{fat}$ cm$^3$
Volume of interesting (non-fat) tissue in breast=$V_{int}$ cm$^3$
And:
Breast Density=$100*V_{int}(V_{int}+V_{fat})$ In one embodiment the present invention relates to a method and system to automatically estimate breast composition (the volumes and breast density) from images for example breast x-rays. For clarity in explanation, this specification will focus on x-ray imaging, although breast composition estimates (of which breast density is one) could also be made on breast MRI and other modalities.

In a preferred embodiment, an image includes x-ray, MRI and other modalities.

Further, a feature of the invention is use in analyzing images generated via x-ray, MRI and other modalities including mammograms over time, dual energy imaging and tomosynthesis, amongst others. Ideally, three dimensional reconstruction of a number of images into a tomosynthesis image would be performed using the $h_{int}$ representation of each mammogram in the sequence.

In a further embodiment, the method and system described herein is applied repeatedly to images gathered over a period of time, thus enabling automatic temporal comparison and thereby predictive analysis. For example, the probability and progress of cancerous tissue is indicated via temporal cross-reference of raw data and optimized monitoring.

The term mammogram is used in this document to refer to a film mammogram, a digital mammogram or one of the digital tomographic projections.

DETAILED DESCRIPTION OF THE ILLUSTRATED EMBODIMENTS

Figure 1:
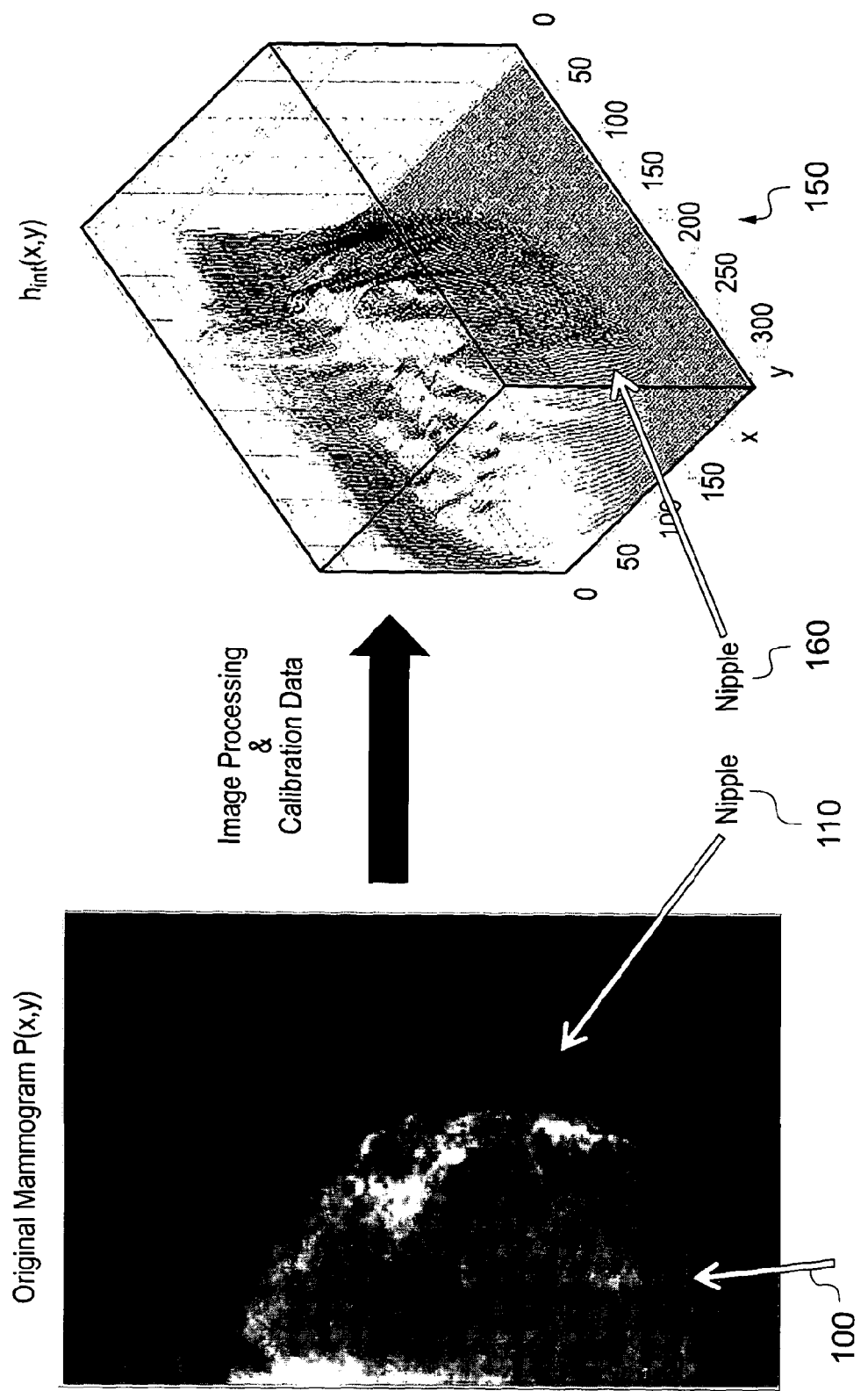
FIG. 1 shows a mammogram (on the left) taken with the x-ray source directly above the breast and sending x-rays downwards; technically, a cranio-caudal mammogram and following processing an $h_{int}$ graph on the right.
Figure 2:
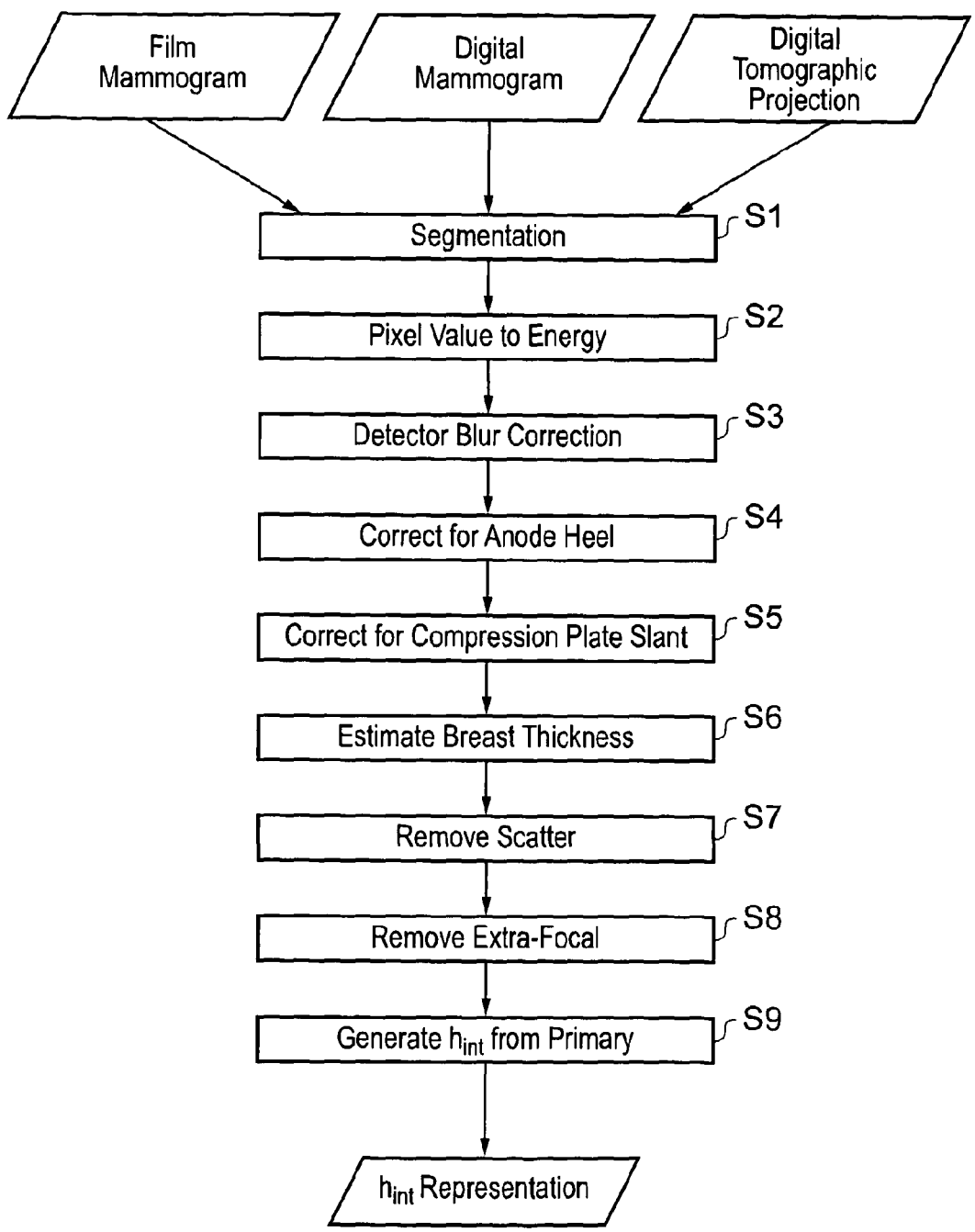
FIG. 2 shows a prior art process for computing interesting tissue.
Figure 3:
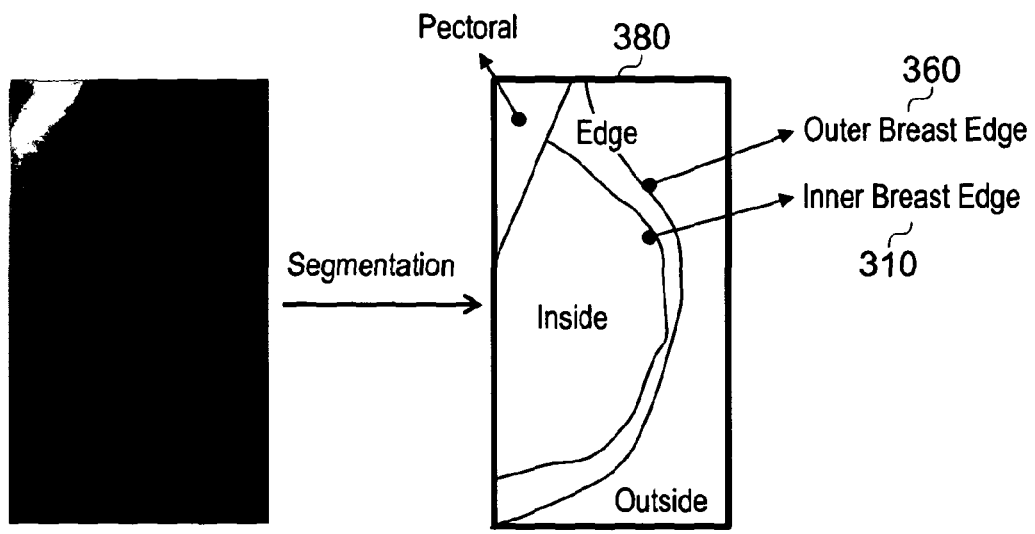
FIG. 3 shows a prior art segmentation step to divide the image into different sections relating to tissue types.
Figure 4:
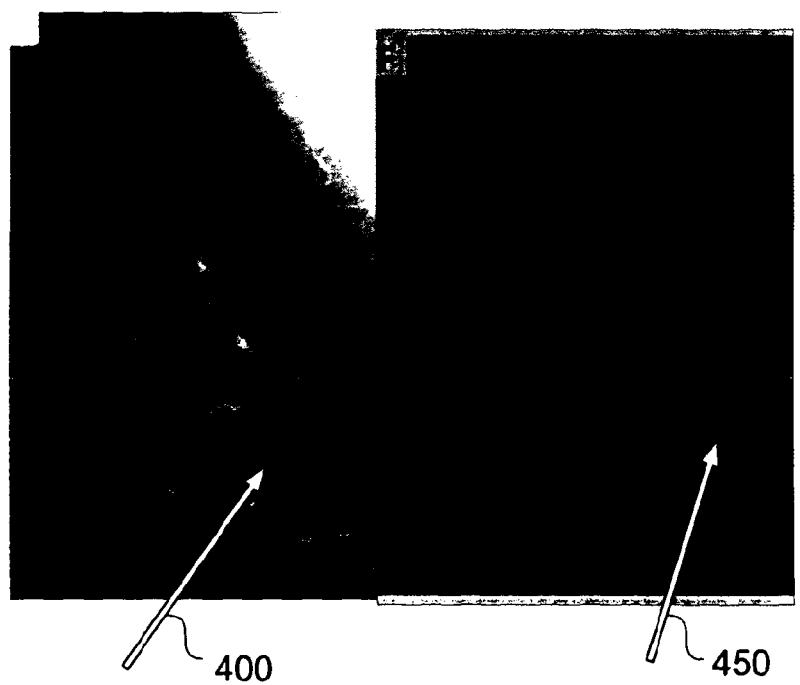
FIG. 4 shows two mammograms of different breasts having different compositions.

In FIG. 1, the mammogram shows a breast 100 which is relatively fatty (as indicated by the relative darkness of the image) with some denser tissue notable towards the nipple 110 (the whiter parts). In what is referred to as the $h_{int}$ representation 150 (on the right of the picture), peaks towards the nipple 160 indicate high values of $h_{int}$, i.e. denser tissue.

Once the $h_{int}$ representation is generated, numerous clinically useful tasks can be performed, including, but not limited to: automatic estimation of breast composition by summing up the $h_{int}$ and $h_{fat}$ values and subsequently computing breast density; optimized display of the image ready for the radiologist to view; tracking an object's development over time to ascertain whether it is growing; computer-aided detection, whereby the computer marks onto the image suspect areas for the radiologist to consider; generally analyzing multiple images (temporal, dual energy, views etc).

Figure 5:
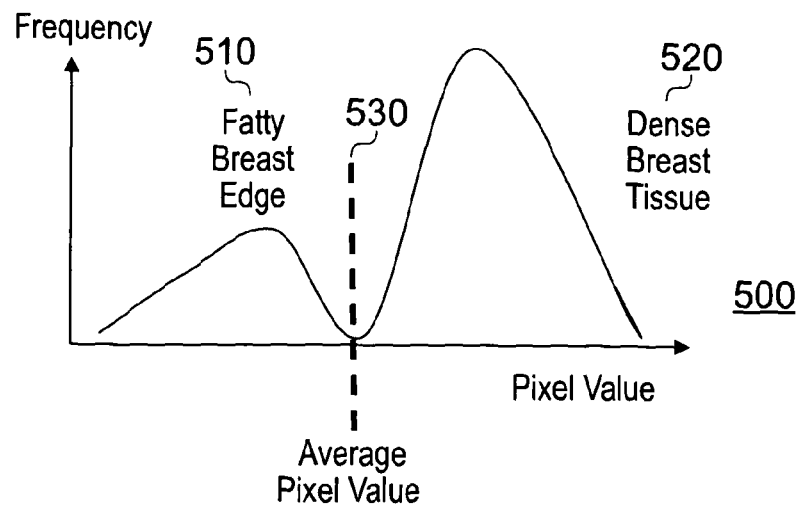
FIG. 5 shows an illustrative histogram for the breast tissue of FIG. 6.
Figure 6:
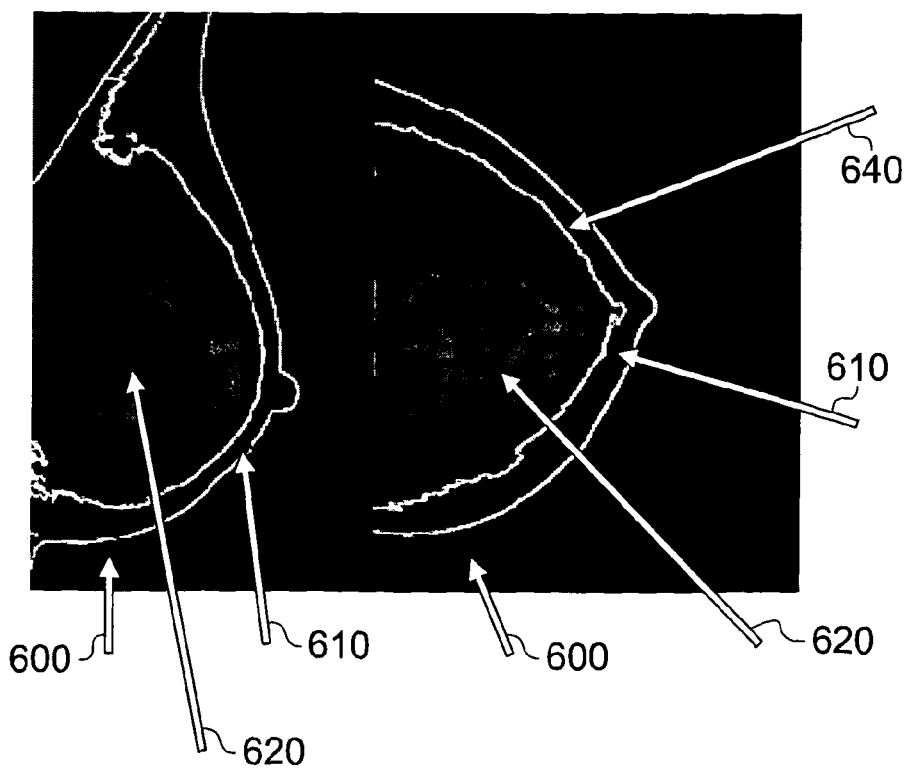
FIG. 6 shows a mammogram image showing a dense breast having a fatty edge portion.

The first embodiment notes that dense breasts 600 have a fatty breast edge 610,510 along with a dense interior 620,520, such as the image shown in FIG. 6, an illustrative histogram 500 for which is provided in FIG. 5. The inner breast edge detection algorithm detects the gap 530 between the two peaks of the breast histogram by, for example, using phase congruency or taking the threshold value set from image statistics computed over the breast tissue. Such techniques are quick, easy to implement and provide an exemplary inner breast edge 640 for dense breasts as illustrated in FIG. 6.

Figure 7:
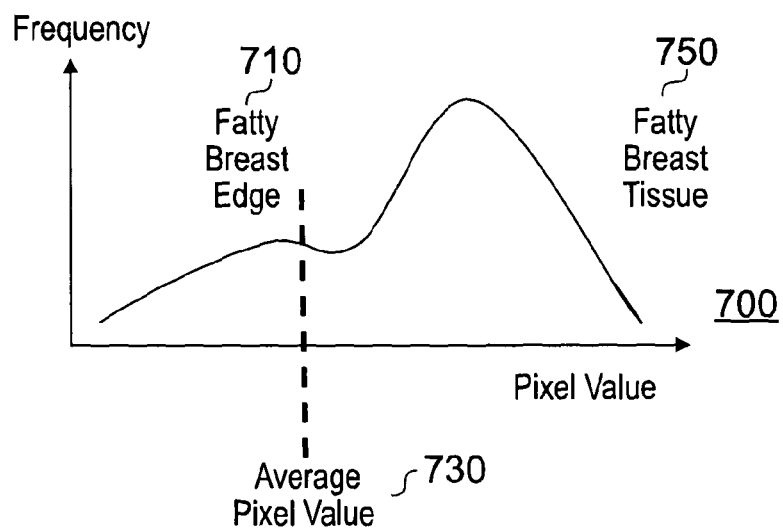
FIG. 7 shows another breast edge.
Figure 8:
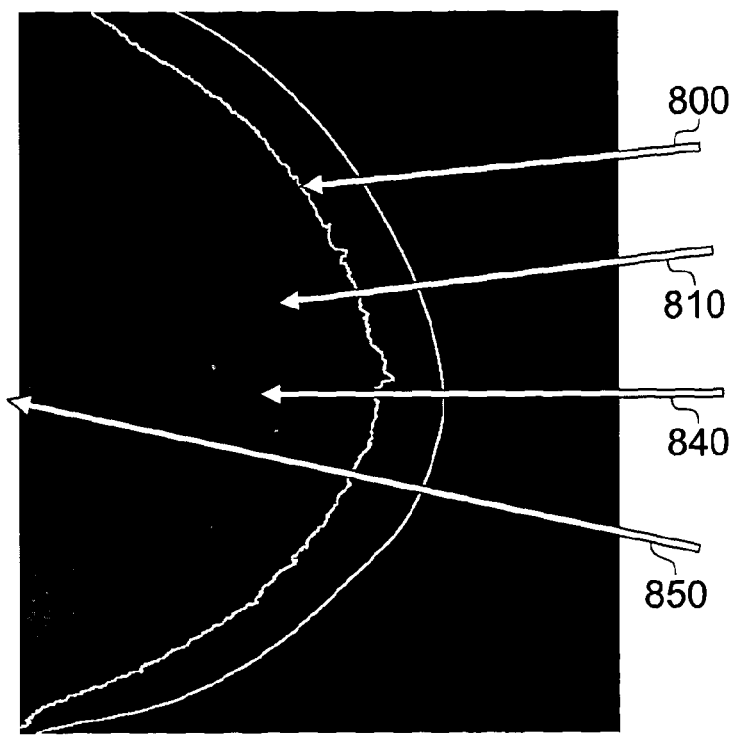
FIG. 8 shows a histogram for the breast edge of FIG. 7.

As illustrated in FIG. 6, the inner breast edge 640 as detected lies entirely on fatty breast tissue (in the fatty breast edge 610); it does not overlay dense tissue 620 and thus produces a high breast density rather than an erroneous low breast density. The inner breast edge 640 as now determined works well for dense breasts. However, it is sub-optimal for fatty breasts 800 which have a histogram 700 more similar to that shown in FIG. 7 providing a breast edge 710,810 as shown in FIG. 8.

The inner breast edge detection algorithm detects the gap 730 between the two peaks of the breast histogram however, the breast edge is too far out and thus generates a breast density which is too high. According to the present invention, the inner breast edge 740,840 as determined above, is moved inwards if the breast is non-dense i.e. composed of fatty tissue 850.

This can be achieved in several ways. Firstly, fatty breasts tend to be larger than dense breasts when projected onto an image, so the inner breast edge can be brought inwards, based on area of the breast. Alternatively, the inner breast edge can be brought inwards until you reach an intensity edge or until you reach a certain smoothness.

By determining a reference value via the inner breast edge, a reliable reference value is achieved and reduces or eliminates reliance on several of the imaging physics factors.

The following results were achieved under varying exposure times for a single image:

|  | −20% (80 mAs) | 0% (100 mAs) | +20% (120 mAs) |
|---|---|---|---|
| Volume of Dense Tissue | 114 cm³ | 114 cm³ | 114 cm³ |
| Volume of Breast | 575 cm³ | 575 cm³ | 575 cm³ |
| Breast Density | 19.8% | 19.8% | 19.8% |

And by varying the kVp for four images at different breast densities:

| Normal Values | | Variation in kVp | | |
|---|---|---|---|---|
| mm | kVp | −2 kVp | 0 | +2 kVp |
| 86 | 30 | 2.2% | 2.3% | 2.4% |
| 32 | 25 | 11.9% | 12.4% | 12.9% |
| 20 | 25 | 18.7% | 19.5% | 20.3% |
| 40 | 28 | 27.3% | 28.1% | 29.0% |

The following represents results from running the software with errors in breast thickness (H) over images of breasts with four different breast densities:

| Normal Values | | Variation in Breast Thickness (H) | | | | |
|---|---|---|---|---|---|---|
| H mm | kVp | −20% | −10% | 0% | +10% | +20% |
| 86 | 30 | 2.5% | 2.4% | 2.3% | 2.2% | 2.1% |
| 32 | 25 | 15.1% | 13.6% | 12.4% | 11.4% | 10.6% |
| 20 | 25 | 23.7% | 21.4% | 19.6% | 18.0% | 16.8% |
| 40 | 28 | 33.6% | 30.5% | 28.1% | 26.2% | 24.4% |

Figure 9:
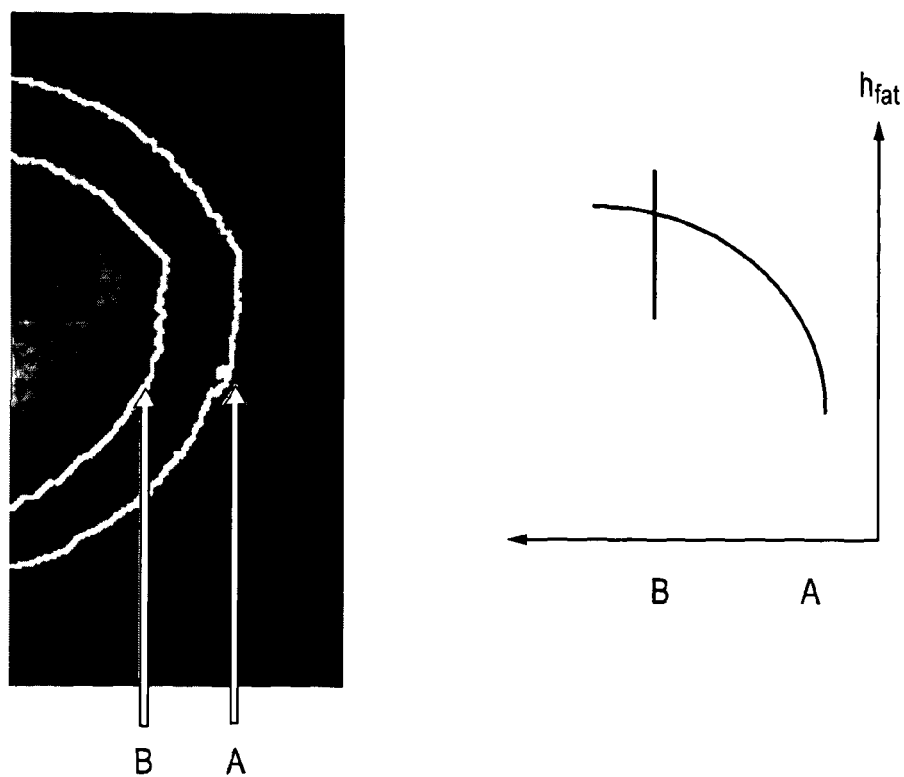
FIG. 9 shows a further breast edge.

A further means to find a good reference value is to use the data in the breast edge to extrapolate a reference pixel value. Digital mammography has a wide dynamic range, which means that the breast edge information is captured relatively accurately even if it is not displayed well without peripheral enhancement. Where the outer and inner breast edges are known (for example, from image processing, or from assuming a semi-circular breast edge) and the recorded breast thickness is known, the tissue between the lines A and B in FIG. 9 can be identified as skin and pure fat (the breast edge almost by definition is fat). If it is assumed there is just a small amount of fat at point A, and if B is known where B is and it is known that a semi-circular breast edge model is a good estimate, then an estimate of the amount of fat at point B can be made and hence a reference pixel value can be worked out to use either for validation of the reference point value from the image directly, or can be used instead.

Alternatively, instead of calibrating to fatty tissue, the above method or the method disclosed in Highnam as cited above can be used to establish that it is a dense breast and that therefore a new reference point is needed. The maximum x-ray attenuation inside the main breast tissue is thus taken and it is assumed that it is all dense tissue with a subcutaneous fat layer top and bottom. From that, the quantitative representation can be computed and then onwards to values at each pixel.

Finding the reference fat value, $P_{fat}$, via any of the routes above appears to reliably provide a fat reference value. From that known value, Equation 1 and Equation 2 can be adjusted to include an explicit, linear, confidence metric ($\kappa$):

$$E_{primary}^{imparted}(x, y) = \kappa \phi(V_t, x, y) A_p t_s \quad \text{Equation 3}$$

$$\int_0^{E_{max}} N_0^{rel}(V_t, \varepsilon) S(\varepsilon) G(\varepsilon) e^{-\mu_{luc}(\varepsilon) h_{plate}} e^{-h\mu(x,y,\varepsilon)} \varepsilon d\varepsilon$$

$\kappa$ is adjusted until the left and right hand sides of the above equation match at the fat reference value.

Figure 10:
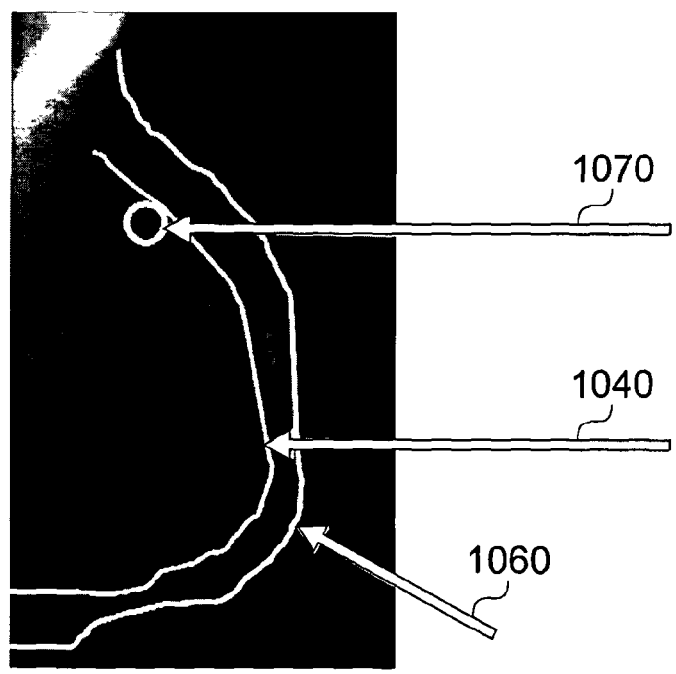
FIG. 10 shows an image of a typical breast showing a reference area.

Thus, as illustrated in FIG. 10, where the inner breast edge 1040 and the outer breast edge 1060 are marked, the area that appears to be mostly fat as indicated by the circle 1070 indicates has a typical compressed breast thickness: i.e. away from the breast roll-off in the edge.

Figure 11:
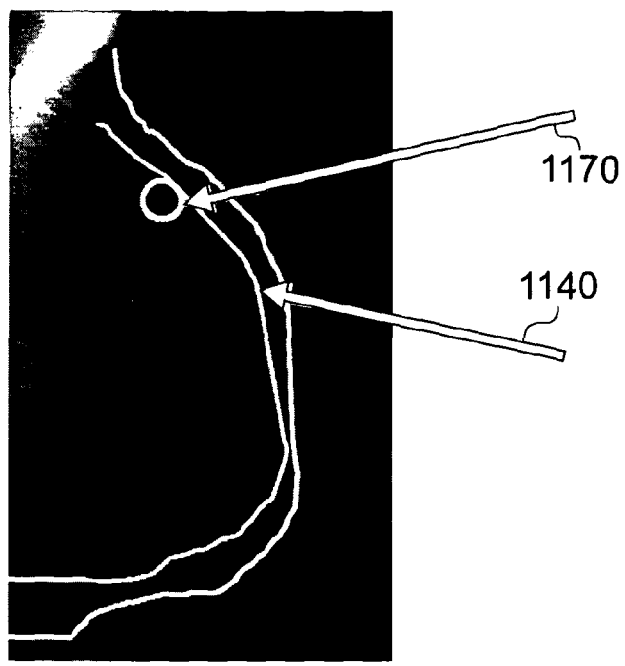
FIG. 11 shows an image having an area of reference tissue which is too far into the breast edge.

By way of further illustration, FIG. 11 illustrates an area of reference tissue 1170 too far out. Thus, if the area of Hcm of mostly fat is too far out into the inner breast edge 1140 and there is actually less than Hcm of fat, then $E_{primary}^{imparted}$ ($h_{int}$=0) is too high and $\kappa$>1.0.

Figure 12:
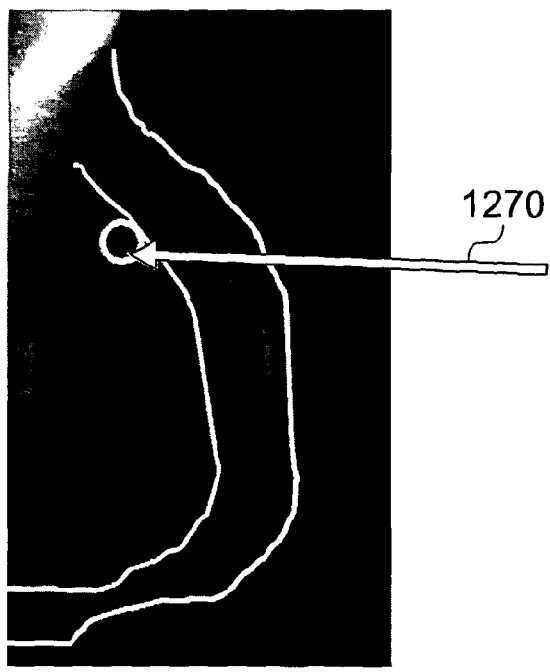
FIG. 12 shows an image where the area of reference tissue is not fat.

FIG. 12 illustrates an area of reference tissue 1270 which is not fat. Thus if the area of Hcm of mostly fat is, instead, an area of dense tissue then:
$E_{primary}^{imparted}$($h_{int}$=0) is too low and $\kappa$<1.0.

Where there are numerous calibration errors, including possibly in the recorded breast thickness, then $\kappa$ is adjusted up or down from 1.0.

Thus, $\kappa$ will be close to 1.0 if all the calibration data is near correct and an appropriate part of the image as the mostly fat area is found. So, $\kappa$ away from 1.0 implies there are errors in the model and corrective action is needed (although, it is difficult to know where the errors have occurred from). In short, there is found a way to recognize errors and to generate explicit confidence measures.

Additionally, a cut off can be provided within the software so that once a certain $\kappa$ value is achieved, for example between 0.95 and 1.05 the data is considered acceptable and the results passed to the user.

Figure 13:
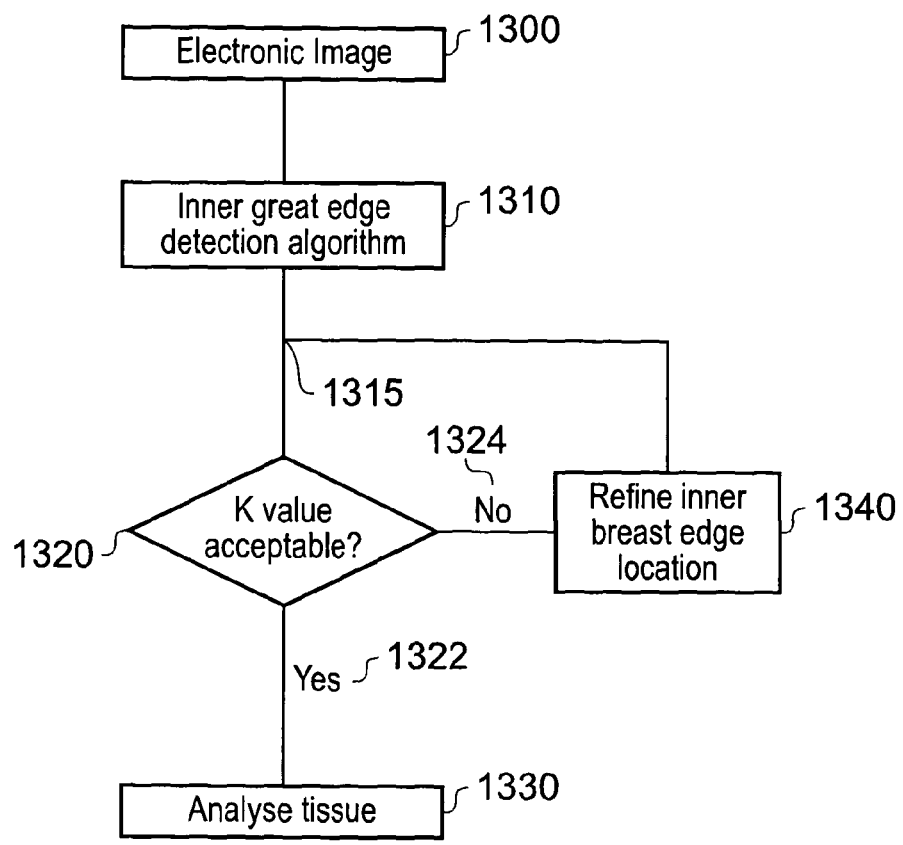
FIG. 13 shows a system according to the invention.

FIG. 13 is a flow diagram of a system according to the invention. An electronic image 1300 is provided and the inner breast edge detection algorithm 1310 is run on the image data. When that has produced a result 1315, a query 1320 asks if the $\kappa$ value or calibration error of the result is acceptable; if yes 1322 then the tissue is analysed 1330 based on the result; if no 1324 then the user is told that there is a calibration issue [CHANGE PICTURE].

If it was known that a fatty breast was being examined and $\kappa$ was found to be a long way from 1.0, it would be evident that there was significant error with the x-ray machine calibration settings. From that, the user could be alerted to carry out quality control or the system could start generating correction parameters.

With reference to breast images, comparison might be based on the volume of fibro-glandular tissue in a region in preference to breast density, as the volumes are more reliable and devoid of issues relating to breast compressions. The results being shown as a subtraction image, which radiologists more readily understand from experience.

Comparison of images may be facilitated via a server, for example, within a hospital. Alternatively, images might be stored, in whole or in part, but sufficient within the DICOM Structured Report for the previous run (which is stored on the PACS system) to enable previous information to be compared on a regional basis. This historical information might be encrypted so that users cannot see it. Temporal comparison might be conducted on CC only, as the MLO image also contains the pectoral muscle which complicates a comparison.

A further embodiment comprises storage and temporal comparison of images via 'the Cloud' or specifically means whereby convenient, on-demand network access to a shared pool of configurable computing resources (e.g. networks, servers, storage, applications, and services) can be rapidly provisioned and released with minimal management effort or service provider interaction. Furthermore, deployment as 'Software as a Service' enables easy update so that all images are being processed with the same algorithm.

In the preferred embodiment, temporal comparison of mammograms is effected via alignment of standardized images produced as described above, perhaps using points of reference such as the nipple and chest wall from which an image within a report is created which demonstrates where in the breast more tissue has developed over the time period. If more tissue is developing (or the tissue is getting "denser") then a cancer might be growing and the radiologist is alerted to inspect this more closely.

It is a further advantage of the present invention that users are able to upload the raw data for analysis and storage in readiness for temporal data for comparison, avoiding the requirement for the user, for example, a hospital, to store raw data. A median volume would serve as a normalizer over time, whereby instead of matching on h_int, h_int/median h_int is used, removing effects such as menopause issues.

It is a further advantage that successful quantification of the breast allows for quantification of calcification by, for example, automatic detection of calcification, subtraction of the background element via our invention, and then quantification of the remaining signal.

It is to be appreciated that these Figures are for illustration purposes only and other configurations are possible.

The invention has been described by way of several embodiments, with modifications and alternatives, but having read and understood this description further embodiments and modifications will be apparent to those skilled in the art. All such embodiments and modifications are intended to fall within the scope of the present invention as defined in the accompanying claims.

The invention claimed is:
1. A method of analyzing tissue from a breast image utilizing a system for analysis of tissue from a breast image, comprising:

operating an electronic breast imager to provide an electronic image of breast tissue (100,400,450,600,800,1100);

operating a histogram generating device to generate a histogram (500, 700) representative of said electronic image of said breast tissue;

running an inner breast detection 1310) on a histogram from an inner breast edge locating device to detect an inner breast edge of said breast tissue and to produce an inner breast edge location (1070,1170,1270,1315);

determining a reference spot on said image of breast tissue using said inner breast edge location with a reference spot determining device;

determining a calibration error with a calibration error determining device, and determining if said calibration error of said inner breast edge location is acceptable (1322); and determining, with a breast density analyzing device, whether said image of breast tissue is of dense breast tissue, and if said image of breast tissue is of dense breast tissue, determining a new reference spot with said reference spot determining device.

2. The method of analyzing tissue according to claim 1, further comprising:

measuring a thickness ($h_{int}$) of breast tissue with a thickness measuring device to assess whether said breast tissue is within a group comprising dense or fatty tissue;

wherein said calibration error determining device determines said calibration error for an $h_{int}$ representation from said reference spot.

3. The method of analyzing tissue according claim 1, further comprising:

detecting a gap which lies between two peaks of said histogram, with a gap detecting device, said gap corresponding to said inner breast edge (1070, 1170, and 1270);

wherein said reference spot determining device uses said inner breast edge to delimit a search for said reference spot.

4. The method of analyzing tissue according to claim 1, wherein:

said inner breast edge locating device uses phase congruency to detect said inner breast edge location.

5. The method of analyzing tissue according to claim 1, wherein:

said inner breast edge locating device detects said inner breast edge location by determining a threshold value from statistics of pixel values of said image of breast tissue.

6. The method of analyzing tissue according to claim 5, wherein:

said statistics include minimum pixel value, maximum pixel value, and average pixel value.

7. The method of analyzing tissue according to claim 1, wherein:

comparing, by said calibration error determining device, said calibration error to an acceptable value (1324), and obtaining a new reference spot with said reference spot determining device when said calibration error is greater than said acceptable value.

8. The method of analyzing tissue according to claim 6, further comprising:

determining a smoothness of said inner breast edge with an inner breast edge smoothness determining device; and iteratively moving, by said inner breast edge moving device, said inner breast edge location inwards wherein each iteration said smoothness determining device determines a smoothness of said inner breast edge, the iterative movement being terminated upon said smoothness of said inner breast edge having a predefined value.

9. The method of analyzing tissue according claim 1, wherein an image of fat tissue is generated from said image of breast tissue comprising:

measuring a thickness ($h_{int}$) of said breast tissue at said reference spot with a thickness measuring device;

measuring a thickness ($h_{fat}$) of fat tissue; and determining, with a composition estimating device, breast density based on said thickness ($h_{int}$) of said breast tissue and said thickness ($h_{fat}$) of said fat tissue.

10. A method of analyzing tissue from a breast image utilizing a system for analysis of tissue from a breast image, comprising:

providing an electronic image of breast tissue (100, 400, 450, 600, 800, 1100) with an electronic breast imager;

generating a histogram (500, 700) representative of said electronic image of said breast tissue with a histogram generating device;

subjecting said histogram to an inner breast edge detector, using an inner breast edge locating device, to detect an inner breast edge on the electronic image of breast tissue, to produce an inner breast edge location (1315);

determining a reference spot on said electronic image of breast tissue using said inner breast edge location (1070, 1170,1270);

calculating a calibration error with a calibration error determining device, and determining whether said calibration error of said inner breast edge location is acceptable (1322);

obtaining a new reference spot, with a breast density analyzing device, when said electronic image of breast tissue is of dense breast tissue; and generating, with a warning generating device, a warning in an event that a calibration error is too large (1324).

* * * * *